(12) United States Patent
Wada et al.

(10) Patent No.: US 7,719,582 B2
(45) Date of Patent: May 18, 2010

(54) SOLID-STATE IMAGING APPARATUS AND ITS SIGNAL READING METHOD

(75) Inventors: Takamasa Wada, Kanagawa (JP); Eiichi Funatsu, Tokyo (JP); Keiji Mabuchi, Kanagawa (JP); Ken Nakajima, Tokyo (JP); Takashi Abe, Kanagawa (JP); Tomoyuki Umeda, Kanagawa (JP); Nobuo Nakamura, Kanagawa (JP); Hiroaki Fujita, Kanagawa (JP); Hiroki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 995 days.

(21) Appl. No.: 10/535,970

(22) PCT Filed: Nov. 21, 2003

(86) PCT No.: PCT/JP03/14882

§ 371 (c)(1),
(2), (4) Date: May 24, 2005

(87) PCT Pub. No.: WO2004/049731

PCT Pub. Date: Jun. 10, 2004

(65) Prior Publication Data

US 2006/0164527 A1 Jul. 27, 2006

(30) Foreign Application Priority Data

Nov. 28, 2002 (JP) ............................. 2002-344833

(51) Int. Cl.
*H04N 3/14* (2006.01)
*H04N 5/335* (2006.01)
(52) U.S. Cl. ..................................... 348/272; 348/179
(58) Field of Classification Search ................ 348/272, 348/279
See application file for complete search history.

(56) References Cited

U.S. PATENT DOCUMENTS

| 5,969,758 | A | * | 10/1999 | Sauer et al. | 348/241 |
|---|---|---|---|---|---|
| 6,141,039 | A | * | 10/2000 | Poetsch | 348/96 |
| 7,271,835 | B2 | * | 9/2007 | Iizuka et al. | 348/314 |
| 7,508,435 | B2 | * | 3/2009 | Loew et al. | 348/316 |
| 2002/0158982 | A1 | * | 10/2002 | Kokubun et al. | 348/308 |
| 2006/0209202 | A1 | * | 9/2006 | Yanai | 348/311 |

FOREIGN PATENT DOCUMENTS

| JP | 2000-12819 | | 1/2000 |
|---|---|---|---|
| JP | 2000-012819 | * | 1/2000 |
| JP | 2000-261815 | | 9/2000 |
| JP | 2000341699 | | 12/2000 |
| JP | 2001-78098 | | 3/2001 |

OTHER PUBLICATIONS

Office Action for Japanese Application No. 2002-34483 filed on Mar. 19, 2007.

* cited by examiner

*Primary Examiner*—Sinh Tran
*Assistant Examiner*—Hung H Lam
(74) *Attorney, Agent, or Firm*—Sonnenschein Nath & Rosenthal LLP

(57) ABSTRACT

When pixel signals are separately read from a plurality of horizontal signal lines to achieve high-speed processing, color difference in image signals and stripes are eliminated.

In the operation of reading the pixel signals from the (2n)th row, the pixel signals from R pixels on odd columns are output to an output system A through a horizontal signal line (60A). On the other hand, the pixel signals from Gr pixels on even columns are output to an output system B through a horizontal signal line (60B). In the operation of reading the pixel signals from the (2n+1)th row, the pixel signals from Gb pixels on the odd columns are output to the output system B through the horizontal signal line (60B) by the switching operation in a switching circuit (50). Similarly, the pixel signals from B pixels on the even columns are output to the output system A through the horizontal signal line (60A) by the switching operation in the switching circuit (50).

6 Claims, 5 Drawing Sheets

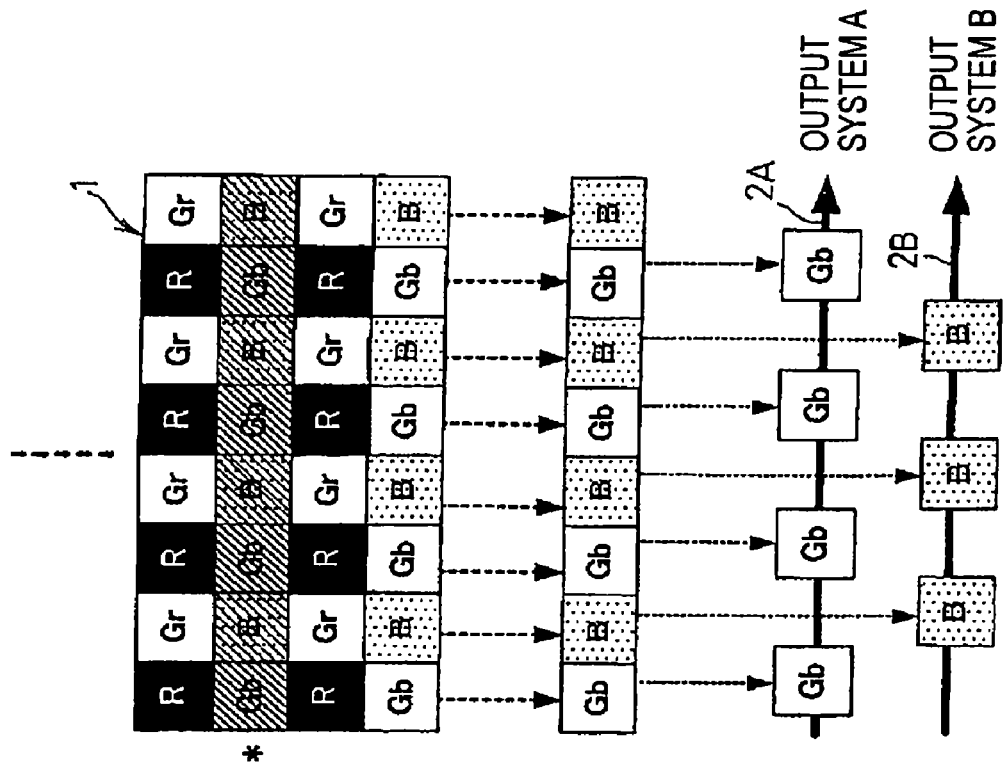
FIG. 5B
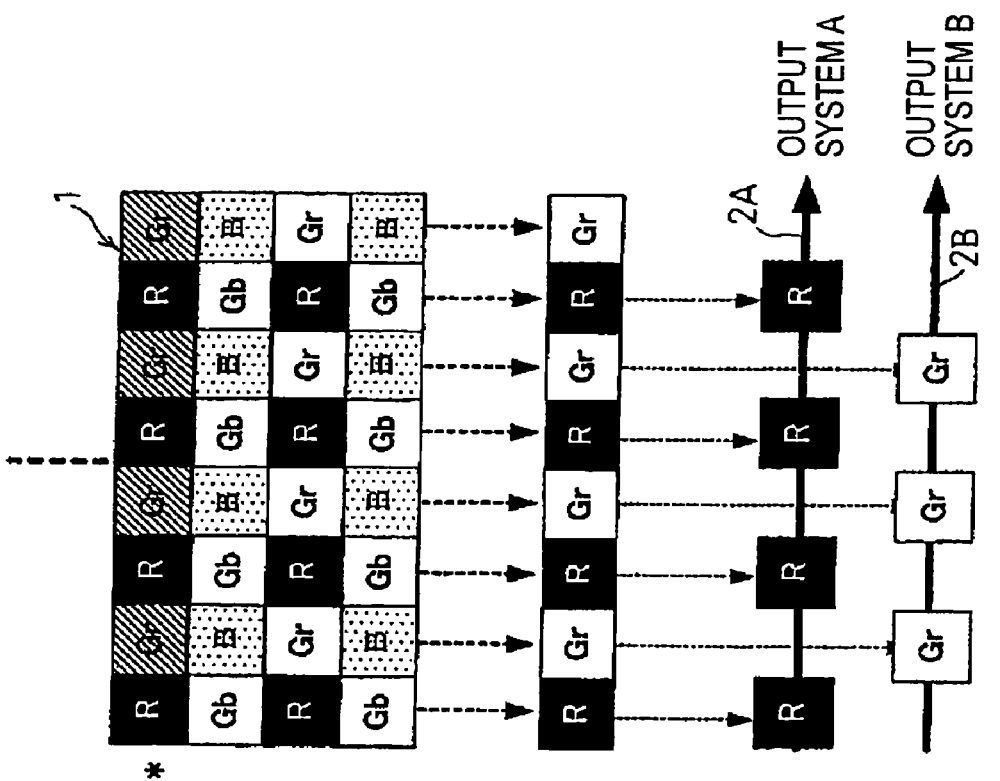
FIG. 5A – PRIOR ART

SOLID-STATE IMAGING APPARATUS AND ITS SIGNAL READING METHOD

TECHNICAL FIELD

The present invention relates to solid-state imaging apparatuses, for example, CMOS sensors that output color images, and to methods for reading signals therefrom.

BACKGROUND ART

In general, a CMOS sensor is a solid-state imaging apparatus including a two-dimensional pixel array having pixels. Each pixel includes a photoelectric transducer for generating signal charge in response to an incident light beam and pixel transistors for converting the signal charge to an electrical signal and for outputting this electrical signal. The CMOS sensor reads individual pixel signals through a plurality of vertical signal lines provided corresponding to individual columns of pixels and processes the read pixel signals to output the processed signals to an output unit through a horizontal signal line.

The CMOS sensor can randomly access the individual pixels by selectively scanning the pixels and signal-processing circuits.

Color filters having a predetermined array pattern are provided on the pixel array to convert an incident light beam on the sensor to light beam components having respective colors. These light beam components enter the respective pixels, and color images are captured.

A known CMOS sensor has a higher reading rate than a CCD sensor, but has only one horizontal signal line. This structure limits a further increase in the reading rate of the known CMOS sensor.

To solve this problem, an attempt to achieve a higher reading rate has been made by increasing the number of horizontal signal lines.

FIGS. 5A and 5B are schematic views illustrating the signal-outputting operation with a certain color arrangement in a pixel array and two horizontal signal lines. In this example, the two horizontal signal lines are dedicatedly assigned to respective pixel columns of the pixel array.

As shown in the drawings, the color arrangement in the pixel array 1 alternately includes RGr rows (the (2n)th row) and GbB rows (the (2n+1)th row). Each RGr row alternately includes red (R) pixels and green (Gr) pixels, and each GbB row alternately includes green (Gb) pixels and blue (B) pixels. In the drawings, the asterisks (*) indicate rows to be read, and the rows are sequentially selected from the top to the bottom.

In FIG. 5A, the (2n)th pixel row is selected, R pixel signals are output to an output system A through a horizontal signal line 2A, and Gr pixel signals are output to an output system B through a horizontal signal line 2B.

In FIG. 5A, the (2n+1)th pixel row is selected, Gb pixel signals are output to the output system A through the horizontal signal line 2A, and B pixel signals are output to the output system B through the horizontal signal line 2B.

However, in the known method for reading pixel signals described above, the Gb pixel signals and the Gr pixel signals that have the same color are separately output to the respective output systems A and B, as shown in FIGS. 5A and 5B. Thus, though the same color in an object is captured through respective color filters, color difference may occur between the pixel rows due to variance in characteristics of, for example, transistors in the different systems. Such color difference generates horizontal stripes.

Since the solid-state imaging apparatus is a high-precision analog circuit processing signals, a slight change in the characteristics of transistors changes the characteristics of pixel signals. Especially, a change in the characteristics of horizontal signal lines causes horizontal stripes that periodically appear when signals are output from all pixels.

This type of problem does not occur when signals are transmitted through a single horizontal signal line. However, the problem may occur when the number of horizontal signal lines is increased to achieve a high reading rate.

It is an object of the present invention to provide a solid-state imaging apparatus and a method for reading signals therefrom that can read pixel signals separately through a plurality of horizontal signal lines at a high reading rate and that can eliminate, for example, color difference in image signals and stripes.

DISCLOSURE OF INVENTION

To achieve the object, a solid-state imaging apparatus according to the present invention includes a two-dimensional pixel array that includes a plurality of pixels each having a color component, and a reading circuit that reads pixel signals generated in the individual pixels in the pixel array through vertical signal lines provided for respective pixel columns and that outputs the pixel signals to an output unit through a plurality of horizontal signal lines. The reading circuit outputs the pixel signals from the pixels having a color component to the same horizontal signal line.

Moreover, a method for reading signals from a solid-state imaging apparatus according to the present invention is provided. The apparatus includes a two-dimensional pixel array that includes a plurality of pixels each having a color component, and a reading circuit that reads pixel signals generated in the individual pixels in the pixel array through vertical signal lines provided for respective pixel columns and that outputs the pixel signals to an output unit through a plurality of horizontal signal lines. The method includes outputting the pixel signals read from the pixel array separately to the plurality of horizontal signal lines and outputting the pixel signals from the pixels having a color component to the same horizontal signal line.

In the solid-state imaging apparatus and the method for reading signals therefrom according to the present invention, when the pixel signals read from the pixel array are separately output through a plurality of horizontal signal lines, the pixel signals from the pixels having a color component are output to the same horizontal signal line.

That is, when the pixel signals are separately output through the plurality of horizontal signal lines to achieve high-speed processing, the pixel signals of the same color can be processed through routes having the same characteristics, and color difference in image signals and stripes can be eliminated. Thus, high-speed processing and an improvement in the image quality can be both achieved.

BRIEF DESCRIPTION OF THE DRAWINGS

FIGS. 5A and 5B are schematic views illustrating the signal-outputting operation with the color arrangement in the pixel array and the two horizontal signal lines in the CMOS sensor shown in FIG. 1.

BEST MODE FOR CARRYING OUT THE INVENTION

A solid-state imaging apparatus according to an embodiment of the present invention will now be described.

Figure 1:
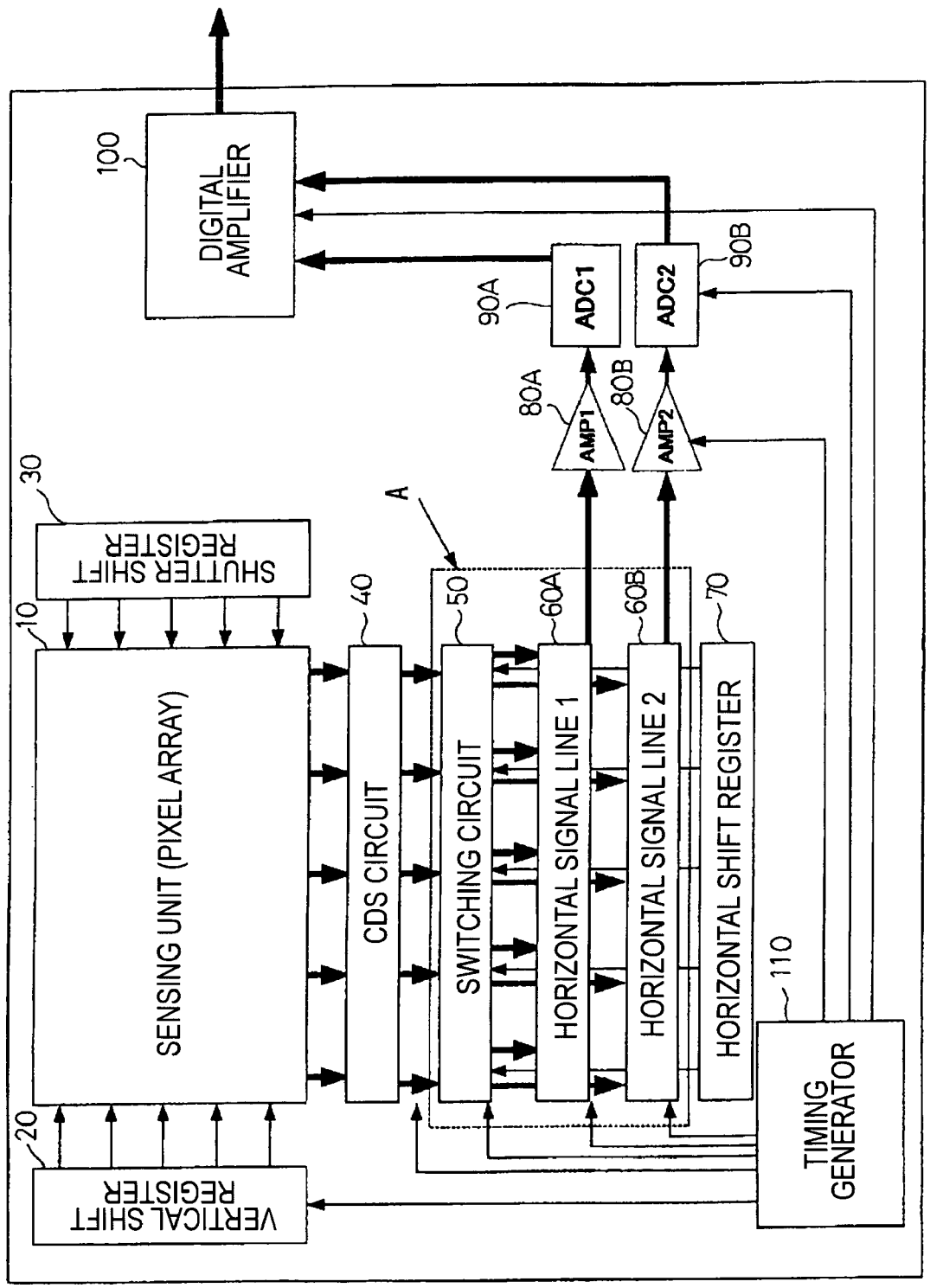
FIG. 1 is a block diagram illustrating the structure of a CMOS sensor according to an embodiment of the present invention.

FIG. 1 is a block diagram illustrating the structure of a CMOS sensor according to the embodiment of the present invention.

As shown in FIG. 1, the CMOS sensor according to the embodiment includes a sensing unit (pixel array) 10, a vertical shift register 20, a shutter shift register 30, a correlated double sampling (CDS) circuit 40, a switching circuit 50, horizontal signal lines 60A and 60B, a horizontal shift register 70, amplifying circuits 80A and 80B, A/D converters 90A and 90B, a digital amplifier 100, and a timing generator 110.

The sensing unit 10 includes pixels in a two-dimensional array. Each pixel includes a photoelectric transducer, for example, a photodiode, and various types of pixel transistors. The sensing unit 10 converts signal charges generated in the photoelectric transducers in the pixels to electrical signals through the pixel transistors and sequentially outputs these pixel signals through vertical signal lines (not shown in FIG. 1) provided for respective pixel columns.

Various types of pixel circuits are available. For example, a pixel circuit may include a transfer transistor that transfers stored charge in a photoelectric transducer to a floating diffusion (FD) part, an amplifying transistor that converts potential change in the FD part to an electrical signal to be output, a reset transistor that resets the potential in the FD part, and a selecting transistor that connects the output of the amplifying transistor to a vertical signal line for each row.

The vertical shift register 20 includes a driving circuit for driving the pixels in the sensing unit 10 row by row and is a circuit that sequentially scans rows to be read in the vertical direction.

The shutter shift register 30 includes a driving circuit for carrying out electronic shuttering in the sensing unit 10 and is a circuit that sequentially scans rows subjected to shuttering in the vertical direction.

The CDS circuit 40 corresponds to respective pixel columns in the sensing unit 10. For each pixel, the CDS circuit 40 detects the difference between a reset level and a signal level output from the pixel through a corresponding vertical signal line and removes fixed-pattern noise in the pixel.

The switching circuit 50 switches output routes of individual pixel signals output through the CDS circuit 40 between the two horizontal signal lines 60A and 60B.

The horizontal shift register 70 sequentially switches the CDS circuit 40 in the horizontal direction and controls the output operation of individual pixel signals.

The amplifying circuits 80A and 80B amplify the individual pixel signals output from the CDS circuit 50 through the horizontal signal lines 60A and 60B with an appropriate gain.

The A/D converters 90A and 90B convert signals from the amplifying circuits 80A and 80B to digital signals, respectively.

The digital amplifier 100 amplifies the signals from the A/D converters (ADC) 90A and 90B to output the amplified signals.

The timing generator 110 generates various types of timing signals to operate the CMOS sensor and supplies the generated timing signals to components in the CMOS sensor.

The overall operation of this CMOS sensor will now be described.

In each pixel in the sensing unit 10, after the shutter shift register 30 carries out a shuttering operation, an exposure operation for a predetermined period starts in order to store signal charge in the photoelectric transducer (photodiode).

In a pixel row selected by the vertical shift register 20, the reset transistor in each pixel starts to operate, and the amplifying transistor outputs a reset level having an output level after a reset operation to the vertical signal line. Then, the transfer transistor transfers the stored charge in the photoelectric transducer, and the amplifying transistor outputs a signal level having an output level after exposure to the vertical signal line.

These levels are sequentially supplied to the CDS circuit 40. The CDS circuit 40 detects the difference between the reset level and the signal level in the pixel, generates a pixel signal free from fixed-pattern noise, and temporarily stores the generated pixel signal.

When each row is subjected to electronic shuttering and is then subjected to signal outputting after a predetermined time elapses, signals that are converted from light beams during the elapsed time from electronic shuttering to signal outputting are output from the row subjected to signal outputting. Thus, the exposure period (charge storage period) of the photoelectric transducer can be changed by adjusting the time shifting between electronic shuttering and signal outputting. The timing generator 110 generates driving pulses for the vertical shift register 20 and the shutter shift register 30. That is, the charge storage period can be changed by adjusting these driving pulses generated in the timing generator 110.

When signals are read from all the pixels, all rows in the sensing unit 10 are sequentially selected from the first row to the last row to be subjected to the shuttering operation and the reading operation.

The output operation through a routing system according to this embodiment will now be described.

A method for eliminating horizontal stripes by outputting pixel signals read from filters having the same color on the (2n)th row and the (2n+1)th row to the same horizontal signal lines 60A and 60B through the switching circuit 50 will be described.

Figure 2B:
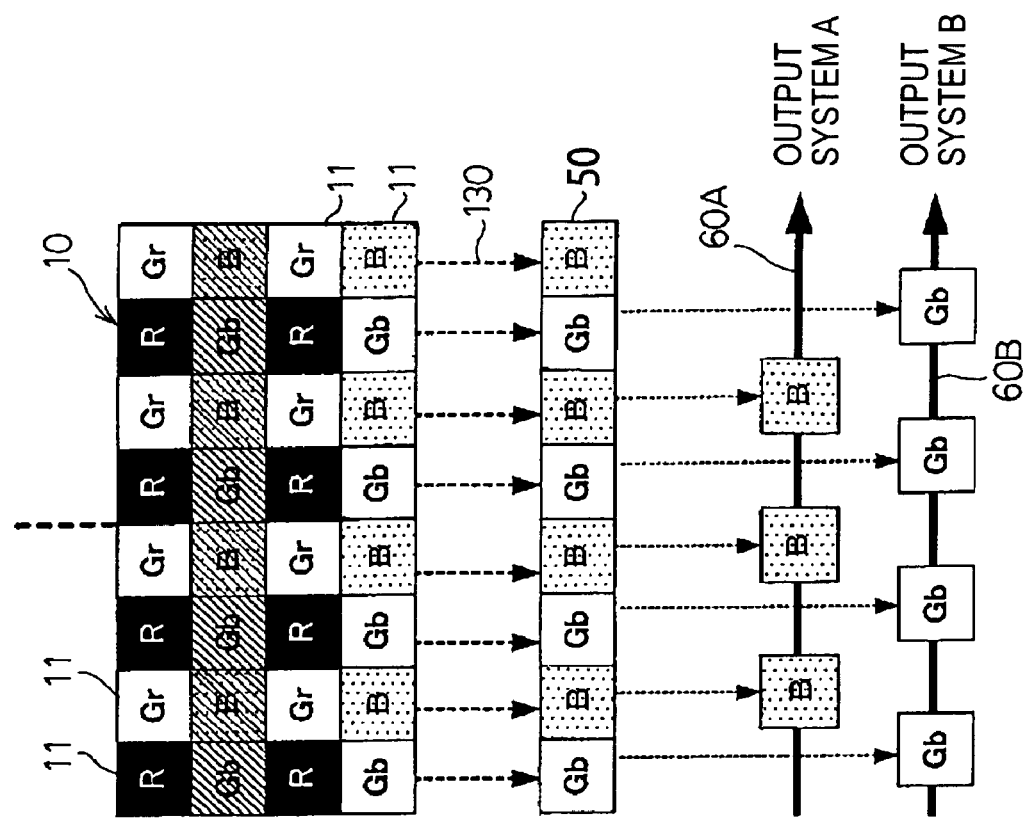
FIGS. 2A and 2B are schematic views illustrating the signal-outputting operation with a certain color arrangement in a pixel array and two horizontal signal lines in the CMOS sensor shown in FIG. 1.
Figure 2A:
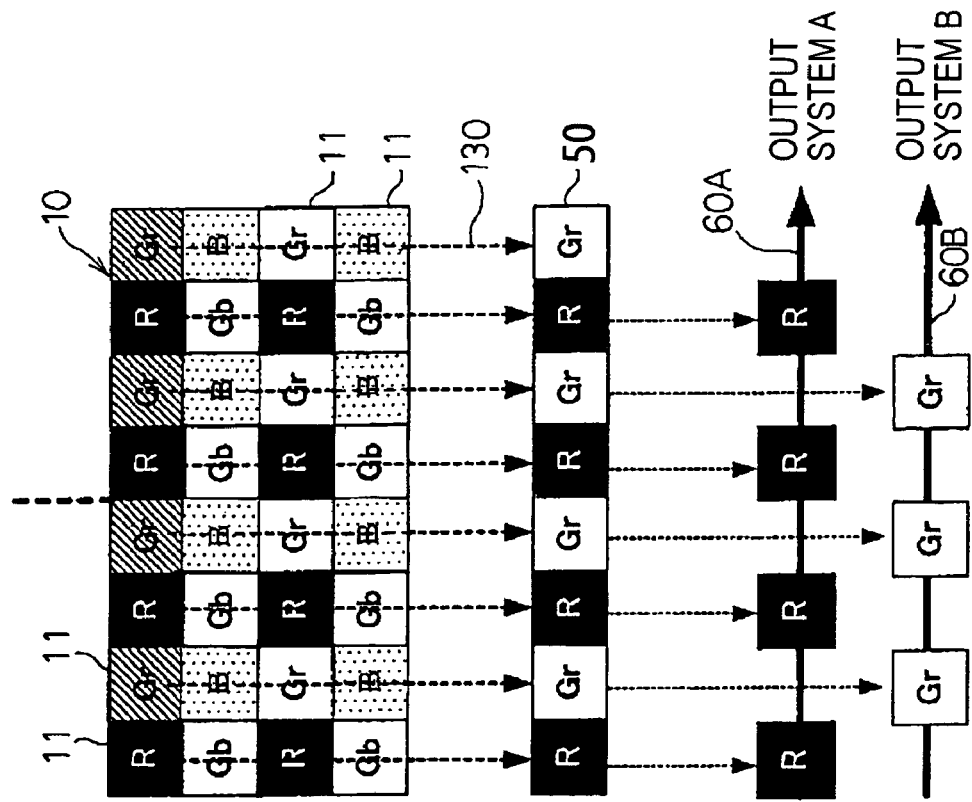

FIGS. 2A and 2B are schematic views illustrating the signal-outputting operation with a certain color arrangement in a pixel array and two horizontal signal lines in this embodiment. In the drawings, the switching circuit 50 switches pixel columns of the pixel array and the two horizontal signal lines.

As shown in the drawings, the color arrangement in the pixel array 10 alternately includes RGr rows (the (2n)th row) and GbB rows (the (2n+1)th row). Each RGr row alternately includes red (R) pixels and green (Gr) pixels, and each GbB row alternately includes green (Gb) pixels and blue (B) pixels. In the drawings, the asterisks (*) indicate rows to be read, and rows subjected to signal outputting are sequentially selected by the vertical shift register 20 from the top to the bottom. Charge signals in the individual pixels are read row by row and are stored in analog memories provided in the CDS circuit 40 or the switching circuit 50.

In FIG. 2A, pixel signals are read from the (2n)th row. Pixel signals from the R pixels on odd columns are output to an output system A through the horizontal signal line 60A. On the other hand, pixel signals from the Gr pixels on even columns are output to an output system B through the horizontal signal line 60B.

In FIG. 2B, pixel signals are read from the (2n+1)th row. Pixel signals from the Gb pixels on the odd columns are output to the output system B through the horizontal signal line 60B by the switching operation of the switching circuit 50. Similarly, pixel signals from the B pixels on the even columns are output to the output system A through the horizontal signal line 60A by the switching operation of the switching circuit 50.

The signals from both the Gr pixels and the Gb pixels having filters of the same color can be output to the output system B through the same horizontal signal line 60B by controlling the above operation of the switching circuit 60 through the timing generator 110.

FIGS. 3A to 3D are circuit diagrams illustrating a detailed structure and the operation of a portion (a region A shown in FIG. 1) including the switching circuit 50 and the horizontal signal lines 60A and 60B. The switching circuit 50 and the horizontal signal lines 60A and 60B according to the embodiment will now be described with reference to the drawings.

Vertical signal lines 130 are connected to analog memories 140A and 140B through respective switches 51A and 51B. The analog memories 140A and 140B serving as capacitors are respectively connected to the horizontal signal lines 60A and 60B through respective switches 52A and 52B. The vertical signal lines 130 are connected to the pixels 11 in the pixel array 10. In FIGS. 3A to 3D, two capacitors are provided for one vertical signal line. Alternatively, three or more capacitors may be provided. The signals from the pixels are subjected to processing, for example, noise cancellation, in the CDS circuit 40 that is shown in FIG. 1 but not in FIGS. 3A to 3D. Then, the processed signals are sent to the respective analog memories 140A and 140B serving as the capacitors. That is, the capacitors oppose the sensing unit 10 with the CDS circuit 40 in FIG. 1 therebetween.

Figure 3B:
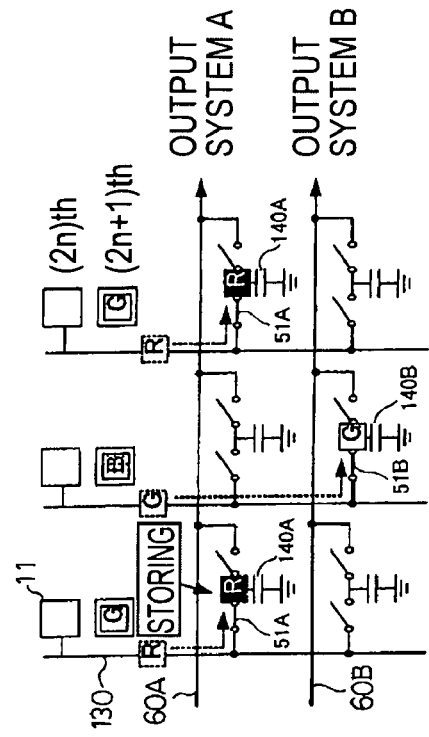
FIGS. 3A to 3D are circuit diagrams illustrating a detailed structure and the operation of a switching circuit and the horizontal signal lines in the CMOS sensor shown in FIG. 1.
Figure 3D:
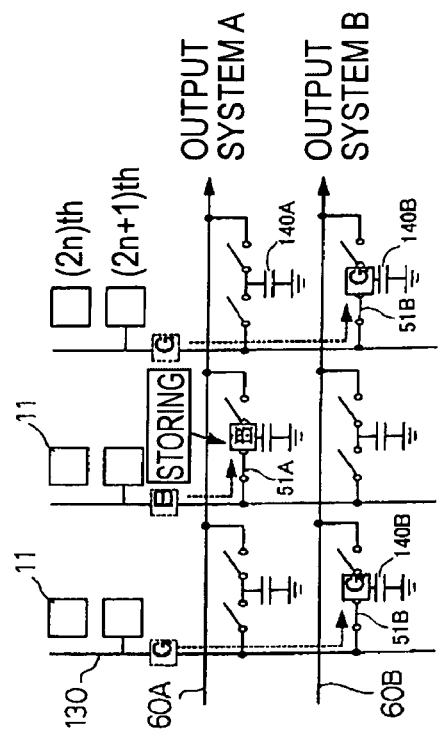
Figure 3A:
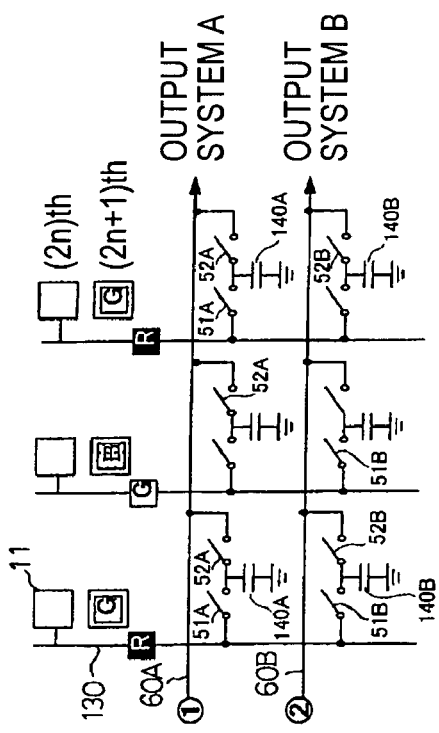

In FIG. 3A, the switches 51A and 51B, which connect the analog memories 140A and 140B to the vertical signal lines 130, and the switches 52A and 52B, which connect the analog memories 140A and 140B to the respective horizontal signal lines 60A and 60B, are turned off (initial state). The signals from the individual pixels 11 are sequentially selected by the vertical shift register 20 and are output to the vertical signal lines 130. In FIG. 3A, the signals from the (2n)th row are selected and are output to the vertical signal lines 130.

Then, in FIG. 3B, the switches 51A for the odd columns and the switches 51B for the even columns are turned on, and the vertical signal lines 130 are connected to the analog memories 140A and 140B (signal reading from the (2n)th row). Among the pixel signals from the (2n)th row, the pixel signals from R filters on the odd columns are stored in the upper analog memories 140A to be connected to the horizontal signal line 60A, and the pixel signals from G filters on the even columns are stored in the lower analog memories 140B to be connected to the horizontal signal line 60B.

Figure 3C:
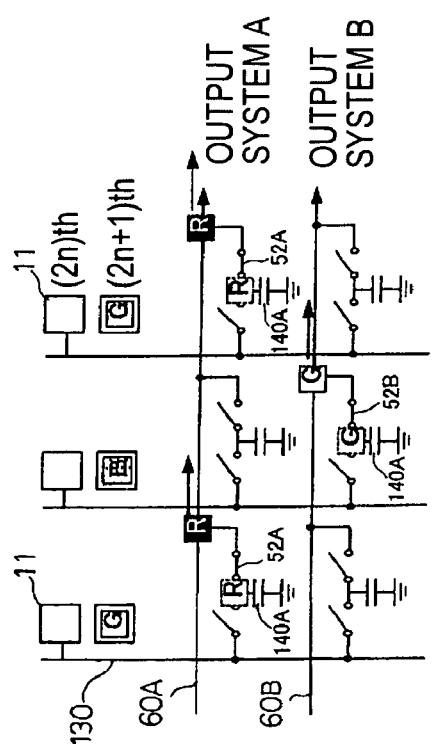

Then, in FIG. 3C, the switches 52A for the odd columns and the switches 52B for the even columns are turned on, and the horizontal signal lines 60A and 60B are respectively connected to the analog memories 140A and 140B (signal outputting from the (2n)th row to horizontal signal lines). The pixel signals from the (2n)th row are sequentially selected by the horizontal shift register 70 and are output to the horizontal signal lines 60A and 60B.

Then, in FIG. 3D, the vertical signal lines 130 are connected to the analog memories 140A and 140B, as in FIG. 3B (signal reading from the (2n+1)th row). In contrast with FIG. 3B, the switches 51B for the odd columns and the switches 51A for the even columns are turned on. To store the pixel signals from G filters on the odd columns of the (2n+1)th row in the analog memories 140B to be connected to the horizontal signal line 60B, which is also used for the pixel signals from the G filters on the even columns of the (2n)th row, the pixel signals from the odd columns are stored in the lower analog memories 140B by turning on the different switches 51A and 51B.

The operation described above is sequentially repeated for the individual rows to output pixel data from filters having the same color to the same horizontal signal line.

Since there is no difference in the route of signals from filters of the same color in this operation, for example, horizontal stripes that appear when an image is captured through different filters having the same color of the pixels can be suppressed. Thus, high-speed processing by separately outputting signals through a plurality of output routes to decrease signal traffic per horizontal signal line and an improvement in the image quality by, for example, suppressing the horizontal stripes can be both achieved.

Moreover, this method does not require correction of output signals and computing elements and frame memories for the correction. Thus, the chip area can be reduced, and the sampling time can be significantly shortened.

In the embodiment described above, the operation of reading signals row by row is described. Outputting signals from filters having the same color to the same horizontal signal line is also effective for improving the image quality when pixel data is read at random. The same effect can be achieved by controlling switching timing.

Though primary-color filters are used in the embodiment described above, complementary-color filters can also have the same effect as long as signals from filters having the same color are output to the same horizontal signal line.

Though the two output systems are provided in the embodiment described above, the present invention is also applicable when three or more separate output systems are provided.

Figure 4:
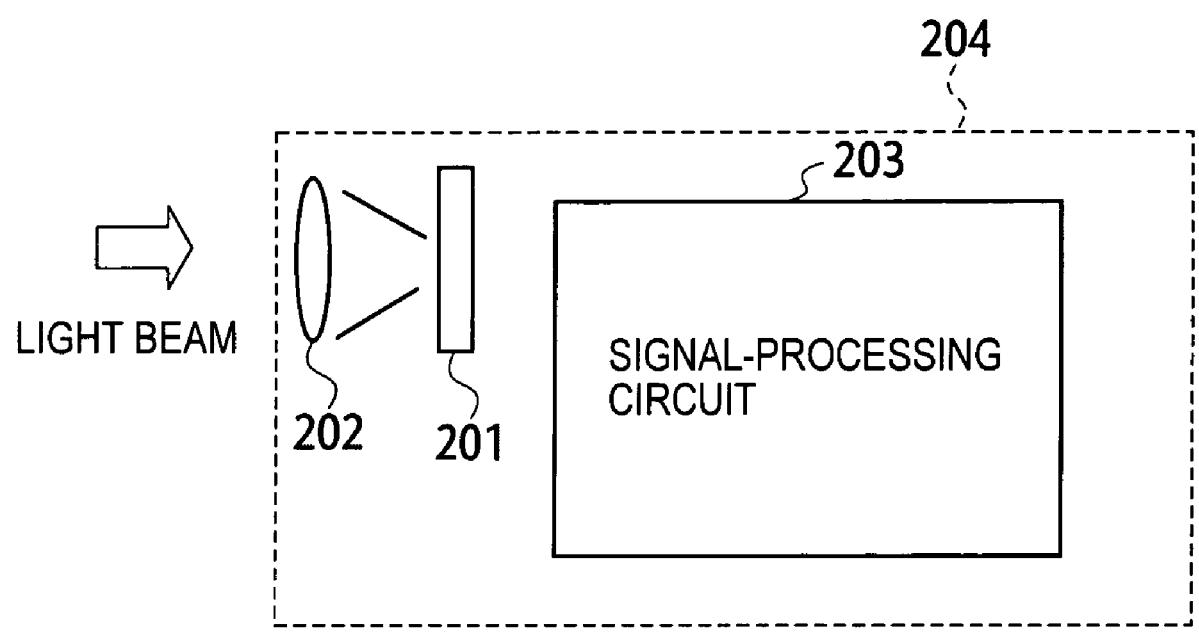
FIG. 4 is a schematic view illustrating a modular solid-state imaging apparatus according to the present invention.

Moreover, as shown in FIG. 4, the present invention is also applicable to a modular solid-state imaging apparatus 204 including an imaging unit 201, a lens system 202, and a signal-processing circuit 203.

INDUSTRIAL APPLICABILITY

As described above, in the solid-state imaging apparatus and the method for reading signals therefrom according to the present invention, when the pixel signals read from the pixel array are separately output through a plurality of horizontal signal lines, the pixel signals from the pixels having a color component are output to the same horizontal signal line. That is, when the pixel signals are separately output through the plurality of horizontal signal lines to achieve high-speed processing, the pixel signals of the same color can be processed through routes having the same characteristics, and color difference in image signals and stripes can be eliminated. Thus, high-speed processing and an improvement in the image quality can be both achieved.

The invention claimed is:
1. A solid-state imaging apparatus comprising:
   a two-dimensional pixel array that includes a plurality of pixels, each of which has a color component; and
   a reading circuit that reads pixel signals generated in the individual pixels in the pixel array through vertical signal lines provided for respective single pixel columns and that outputs the pixel signals to an output unit through first and second horizontal signal lines,
wherein,
   the reading circuit (i) outputs the pixel signals having the same color component to the same one of the first or the second horizontal signal lines, (ii) alternately reads odd pixels of odd or even rows in the plurality of pixels into the first horizontal signal line through odd columns and (iii) alternately reads even pixels of the odd or the even rows in the plurality of pixels to the second horizontal signal line through even columns such that each of the plurality of pixels along each of the vertical signal lines is alternately read into a different one of the first horizontal signal line and the second horizontal signal line.

2. The solid-state imaging apparatus according to claim 1, further comprising color filters that are provided on the pixel array and that allow light beam components having respective colors to enter the pixels.

3. The solid-state imaging apparatus according to claim 1, wherein the reading circuit includes a switching circuit that separately outputs the pixel signals read through the vertical signal lines to the first and second horizontal signal lines.

4. The solid-state imaging apparatus according to claim 3, further comprising a timing generating circuit that controls the switching operation of the switching circuit.

5. The solid-state imaging apparatus according to claim 1, wherein the reading circuit includes a signal-processing circuit that performs a predetermined signal processing on the pixel signals read through the vertical signal lines.

6. A method for reading signals from a solid-state imaging apparatus, the apparatus comprising a two-dimensional pixel array that includes a plurality of pixels each having a color component, and a reading circuit that reads pixel signals generated in the individual pixels in the pixel array through vertical signal lines provided for respective single pixel columns and that outputs the pixel signals to an output unit through first and second horizontal signal lines, the method comprising the steps of:

outputting the pixel signals having the same color component to the one of the first or the second horizontal signal lines, alternately reading odd pixels of odd or even rows in the plurality of pixels into the first horizontal signal line through odd columns, and alternately reading even pixels of the odd or the even rows in the plurality of pixels to the second horizontal signal line through even columns such that each of the plurality of pixels along each of the vertical signal lines is alternately read into a different one of the first horizontal signal line and the second horizontal signal line.

* * * * *